(12) United States Patent
Larson et al.

(10) Patent No.: US 12,352,294 B2
(45) Date of Patent: Jul. 8, 2025

(54) DUAL MODE FORCE CONTROL FOR SURFACE ENGAGING MACHINERY

(71) Applicant: Parker-Hannifin Corporation, Cleveland, OH (US)

(72) Inventors: Jacob S. Larson, Falcon Heights, MN (US); David C. Schulte, Naperville, IL (US)

(73) Assignee: Parker Hannifin Corporation, Cleveland, OH (US)

( * ) Notice: Subject to any disclaimer, the term of this patent is extended or adjusted under 35 U.S.C. 154(b) by 8 days.

(21) Appl. No.: 18/581,628

(22) Filed: Feb. 20, 2024

(65) Prior Publication Data

US 2024/0392810 A1 Nov. 28, 2024

Related U.S. Application Data

(60) Provisional application No. 63/504,284, filed on May 25, 2023.

(51) Int. Cl.

| | | |
|---|---|---|
| *F15B 13/043* | (2006.01) | |
| *F15B 21/00* | (2006.01) | |
| *A01B 33/02* | (2006.01) | |
| *A01B 63/10* | (2006.01) | |
| *A01B 63/111* | (2006.01) | |
| *A01C 7/20* | (2006.01) | |

(52) U.S. Cl.
CPC ........ *F15B 13/0431* (2013.01); *F15B 21/005* (2013.01); *A01B 33/024* (2013.01); *A01B 63/10* (2013.01); *A01B 63/111* (2013.01); *A01C 7/205* (2013.01); *F15B 2201/411* (2013.01); *F15B 2201/51* (2013.01)

(58) Field of Classification Search
CPC ................ F15B 13/0431; F15B 21/005; F15B 2201/411; F15B 2201/51; A01B 33/024; A01B 63/10; A01B 63/111; A01C 7/205
USPC ..................................... 137/625.64
See application file for complete search history.

(56) References Cited

U.S. PATENT DOCUMENTS

| | | | | |
|---|---|---|---|---|
| 5,065,681 | A | * 11/1991 | Hadley | ................ A01B 63/114 111/55 |
| 9,068,323 | B2 | 6/2015 | Peterson et al. | |
| 10,512,202 | B2 | 12/2019 | Adams et al. | |
| 11,246,254 | B1 | 2/2022 | Schulte | |

(Continued)

FOREIGN PATENT DOCUMENTS

| | | |
|---|---|---|
| CA | 2 841 309 C | 3/2015 |
| EP | 1 642 035 B1 | 11/2008 |

OTHER PUBLICATIONS

Planter Down Force, Precision Planting—Furrow Force, Oct. 18, 2019.

(Continued)

*Primary Examiner* — Minh Q Le
(74) *Attorney, Agent, or Firm* — McDonnell Boehnen Hulbert & Berghoff LLP

(57) ABSTRACT

An example control system includes: a source of fluid; a cylinder actuator having: (i) cylinder, and (ii) a piston movable within the cylinder and dividing an internal space of the cylinder into a first chamber and a second chamber; a pressure control valve; a pilot-operated valve having a pilot port that is fluidly coupled to the source; and a proportional control valve configured to fluidly couple the source of fluid to the second chamber.

20 Claims, 5 Drawing Sheets

(56) References Cited

U.S. PATENT DOCUMENTS

| | | | | |
|---|---|---|---|---|
| 11,678,597 | B2* | 6/2023 | Schulte | F15B 9/03 |
| | | | | 701/50 |
| 12,127,492 | B2* | 10/2024 | Thompson | A01C 5/068 |
| 2010/0029485 | A1 | 2/2010 | Livore et al. | |
| 2010/0198529 | A1* | 8/2010 | Sauder | A01B 63/002 |
| | | | | 702/41 |
| 2012/0048159 | A1* | 3/2012 | Adams | A01C 7/203 |
| | | | | 111/163 |
| 2012/0048160 | A1* | 3/2012 | Adams | A01C 5/066 |
| | | | | 111/163 |
| 2012/0232691 | A1* | 9/2012 | Green | A01C 7/203 |
| | | | | 700/231 |
| 2014/0048295 | A1* | 2/2014 | Bassett | A01B 63/24 |
| | | | | 172/2 |
| 2015/0176614 | A1 | 6/2015 | Stoller et al. | |
| 2015/0230391 | A1* | 8/2015 | Houck | A01C 7/205 |
| | | | | 701/50 |
| 2016/0044857 | A1 | 2/2016 | Sporrer et al. | |
| 2016/0165788 | A1* | 6/2016 | Anderson | A01C 5/066 |
| | | | | 111/193 |
| 2017/0086347 | A1 | 3/2017 | Sauder et al. | |
| 2018/0132414 | A1 | 5/2018 | Sauder et al. | |
| 2020/0337213 | A1* | 10/2020 | Schoeny | A01C 7/203 |
| 2021/0102626 | A1 | 4/2021 | Fukuda et al. | |
| 2023/0337564 | A1* | 10/2023 | Larson | A01B 63/008 |

OTHER PUBLICATIONS

Planter Down Force, Delta Force, 2015 Guide, Nov. 6, 2015.
Extended European Search Report issued by the European Patent Office in Application No. EP 24 15 9727.7 dated Aug. 22, 2024.

* cited by examiner

400

OPERATING A CONTROL SYSTEM IN A FIRST MODE OF OPERATION, WHEREIN OPERATING THE CONTROL SYSTEM IN THE FIRST MODE OF OPERATION COMPRISES:
PROVIDING FLUID FROM A SOURCE OF FLUID AT A PRESSURE LEVEL ABOVE A THRESHOLD PRESSURE VALUE, WHICH ACTUATES A PILOT-OPERATED VALVE VIA A PILOT SIGNAL TO A PILOT PORT, THEREBY FLUIDLY COUPLING THE SOURCE THROUGH A PRESSURE CONTROL VALVE AND THE PILOT-OPERATED VALVE TO A FIRST CHAMBER OF A CYLINDER ACTUATOR, AND
ACTUATING A PROPORTIONAL CONTROL VALVE TO FLUIDLY COUPLE THE SOURCE OF FLUID THROUGH THE PROPORTIONAL CONTROL VALVE TO A SECOND CHAMBER OF THE CYLINDER ACTUATOR — 402

OPERATING THE CONTROL SYSTEM IN A SECOND MODE OF OPERATION, WHEREIN OPERATING THE CONTROL SYSTEM IN THE SECOND MODE OF OPERATION COMPRISES:
CAUSING THE SOURCE TO PROVIDE FLUID AT A PRESSURE LEVEL BELOW THE THRESHOLD PRESSURE VALUE, THEREBY CAUSING THE PILOT-OPERATED VALVE TO BE IN AN UNACTUATED STATE, BLOCKING FLUID FLOW FROM THE SOURCE TO THE FIRST CHAMBER, AND ACTUATING THE PROPORTIONAL CONTROL VALVE TO FLUIDLY COUPLE THE SOURCE THROUGH THE PROPORTIONAL CONTROL VALVE TO THE SECOND CHAMBER — 404

FIG. 4

DUAL MODE FORCE CONTROL FOR SURFACE ENGAGING MACHINERY

CROSS REFERENCE TO RELATED APPLICATION

The present application claims priority to U.S. Provisional Patent Application No. 63/504,284 filed on May 25, 2023, the entire contents of which are herein incorporated by reference as if fully set forth in this description.

BACKGROUND

Conventional surface engaging machines (e.g., planters, seeders, tillage machines, mowers, planter row cleaners, a rotary broom/brush that could move debris from sidewalks, etc.) used springs, weights, or air bags in an attempt to maintain surface contact between a unit of the machine and the surface. Recent advancements have incorporated fluid power cylinders into these systems.

In an example, as an agricultural surface (e.g., ground) engaging unit travels across fields, it is difficult to maintain constant surface engagement position (e.g., seeding depth) and other parameters using such conventional methods due to changing soil conditions (soil types, moisture, surface height, etc.). This problem is exacerbated by demands for machines to travel at faster speeds. It may thus be desirable to be able to vary the unit downforce to adapt to different soil conditions.

One solution to such problem is to replace conventional downforce methods (e.g., spring, weights, or airbag) with an active force control system. Such an active force control system may enable each individual agricultural surface engaging unit (e.g., row or section) to react to the soil it encounters independently of the other units. In one such system, force or pressure feedback may be used to modify the surface engaging force so as to maintain a particular downforce.

In some cases, it may be desirable to control the force with a high resolution. Controlling forces with high resolution can be difficult particularly at low force magnitudes. For example, hysteresis of one or more valves involved in the hydraulic system could cause large fluctuations in force magnitude for the same command.

It may thus be desirable to configure the system in a manner that enables controlling forces, particularly low magnitude forces, with high precision. It is with respect to these and other considerations that the disclosure made herein is presented.

SUMMARY

The present disclosure describes implementations that relate to dual mode force control for surface engaging machinery.

In a first example implementation, the present disclosure describes a control system. The control system includes: a source of fluid; a cylinder actuator having: (i) a cylinder, and (ii) a piston movable within the cylinder and dividing an internal space of the cylinder into a first chamber and a second chamber; a pressure control valve; a pilot-operated valve having a pilot port that is fluidly coupled to the source; and a proportional control valve, wherein the pilot-operated valve operates in: (i) a first mode of operation, wherein the source provides fluid at a pressure level above a threshold pressure value, which actuates the pilot-operated valve via a pilot signal to the pilot port, thereby fluidly coupling the source through the pressure control valve and the pilot-operated valve to the first chamber, while fluidly coupling the source through the proportional control valve to the second chamber, and (ii) a second mode of operation, wherein the source provides fluid at a pressure level below the threshold pressure value, thereby causing the pilot-operated valve to be in an unactuated state, blocking fluid flow from the source through the pressure control valve to the first chamber, while fluidly coupling the source through the proportional control valve to the second chamber.

In a second example implementation, the present disclosure describes a surface engaging machine. The surface engaging machine includes (i) a plurality of row units, wherein at least one row unit of the plurality of row units has a surface engaging implement, and (ii) the control system of the first example implementation where the piston is coupled to the surface engaging implement.

In a third example implementation, the present disclosure describes a method of operating the control system of the first or second example implementation.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

FIG. 4 is a flowchart of a method of operating a control system, in accordance with an example implementation.

DETAILED DESCRIPTION

Disclosed herein are systems and methods for enabling surface engaging machines to control surface engagement forces (e.g., downward forces) at high precision. The term "surface" is used throughout herein to indicate any vertical or horizontal surface or plane. Example surfaces include ground, soil, wall, road, machine surfaces, etc. Further, example surface engaging machinery could include a seeder or planter, a tillage implement, a grass cutting machine, planter row cleaners, road resurfacing machines, etc.

The disclosed systems and methods include a fluid control systems and an actuator. The term "fluid" is used herein as including any gas or liquid, and thus the fluid systems described herein could be hydraulic or pneumatic systems.

Figure 1A:
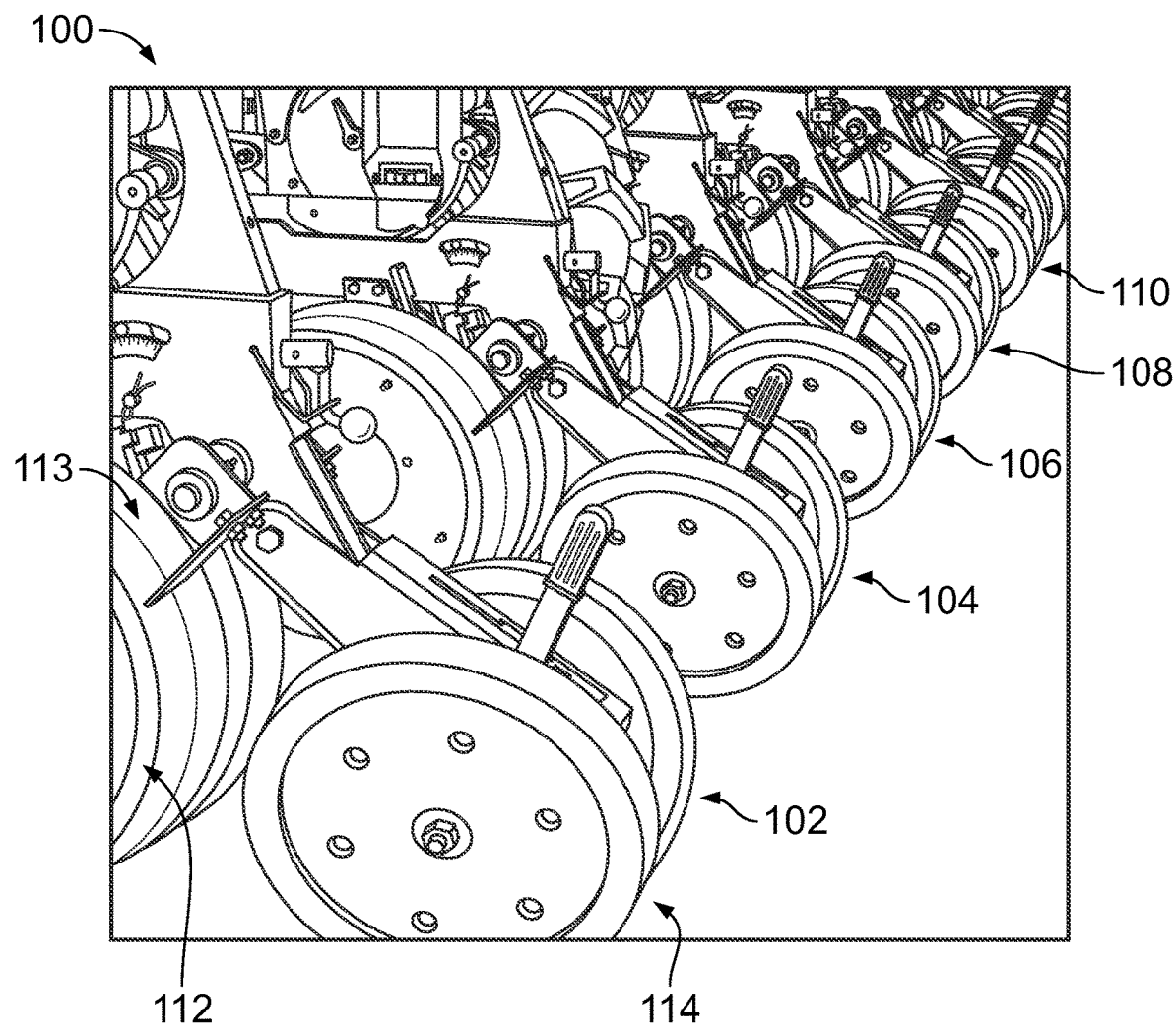
FIG. 1A illustrates a partial view of a surface engaging machine, in accordance with an example implementation.

FIG. 1A illustrates a partial view of a surface engaging machine 100, in accordance with an example implementation. The surface engaging machine 100 shown in FIG. 1A can be a seeder or planter that is attached to a tractor, for example. A seeder/planter is used herein as an example. However, it should be understood that the systems, methods, and concepts discussed herein are applicable to any surface engaging machine such as tillage machines, mowers, row unit cleaners, a rotary broom/brush that could move dust from sidewalks, or any other machine that requires engagement of an implement with the surface.

The surface engaging machine 100 has several surface engaging row units such as row unit 102, row unit 104, row unit 106, row unit 108, and row unit 110. As the surface engaging machine 100 traverses a field, each row unit sows or plants seeds in straight lines in raised or flat soil beds.

Figure 1B:
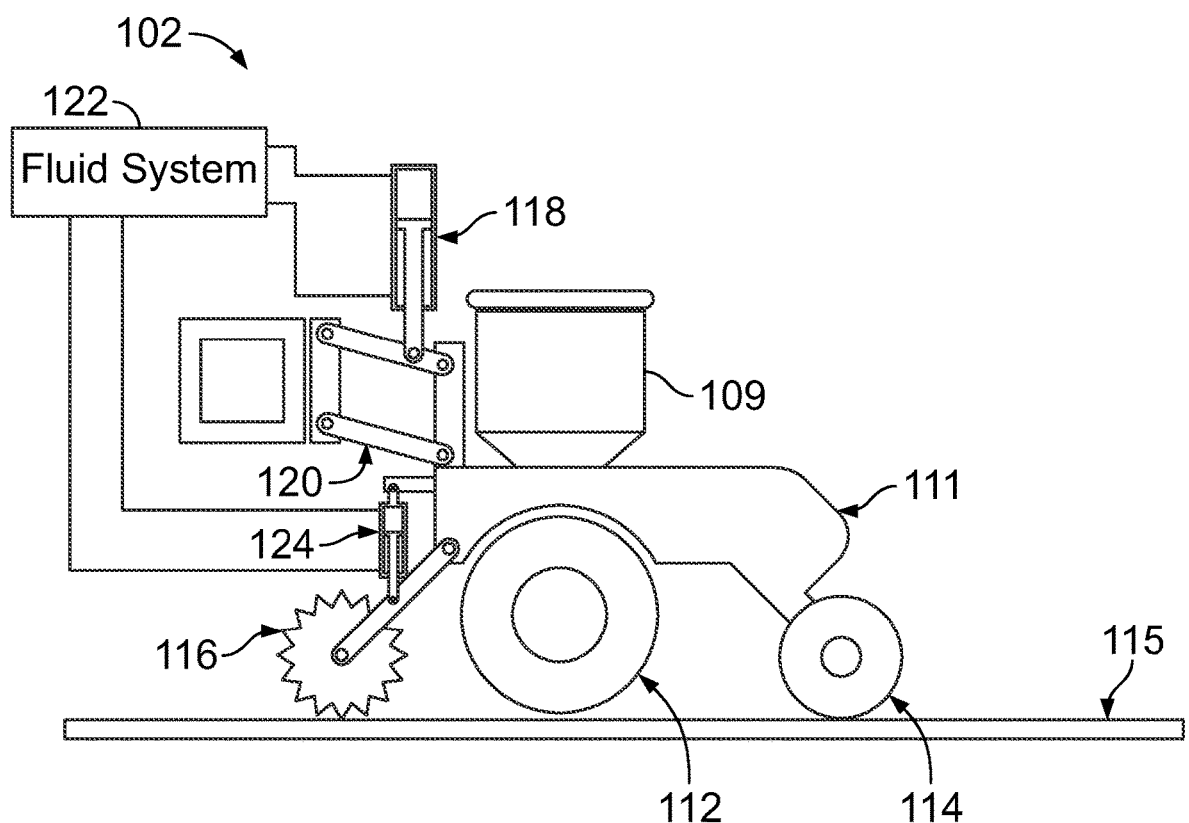
FIG. 1B illustrates a schematic view of a surface engaging unit of the surface engaging machine of FIG. 1A, in accordance with an example implementation.

FIG. 1B illustrates a schematic view of the row unit 102, in accordance with an example implementation. Referring to FIGS. 1A, 1B together, the surface engaging machine 100 can have a seed tank 109 storing seeds (e.g., corn, soy, etc.). Blowers can be used to direct seeds from the seed tank 109 through seed tubes (not shown) to the rowing units 102-110.

The row unit 102 can have a surface engaging implement 111 including gauge wheels 112 (e.g., adjustable wheels attached to a plow or planter to regulate the depth of penetration into the soil) and disk openers 113 (see FIG. 1A), which include metal disks that contact a surface 115 (e.g., ground) to cut a trench at a particular depth to plant the seeds. The height of the gauge wheels 112 controls the height of the disk openers 113. For instance, raising the gauge wheels 112 can lower the disk openers 113 to cut a deeper trench and vice versa.

As the depth of the trench that the seed opener digs is correlated with the height of the gauge wheels 112, it may be desirable to maintain contact between the gauge wheels 112 and the surface 115 as the surface engaging machine 100 traverses the field. To maintain such contact, it may be desirable to have the individual row units apply a particular downforce on the respective gauge wheels so as to maintain surface contact and to firm the soil at the edges of the trench to which the seed is placed.

The row unit 102 can include a cylinder actuator 118 that is coupled to the surface engaging implement 111 and configured to apply a downforce thereto. In an example, the cylinder actuator 118 can be coupled to the surface engaging implement 111 via a linkage 120. The cylinder actuator 118 is configured to apply a downforce on the surface engaging implement 111. Such downforce causes the gauge wheels 112 and the disk openers 113 to apply a corresponding downforce force on the surface 115, and may thus affect the surface engagement position of the disk openers 113. A fluid system 122 (e.g., as described below with respect to FIGS. 2-3) is used to control fluid flow to and from the cylinder actuator 118 to change the force applied by the cylinder actuator 118 to the surface engaging implement 111.

In an example, the row unit 102 also has a row cleaner 116 formed as a spiked wheel. The row cleaner 116 is disposed ahead of the gauge wheel 112 and the disk openers 113, and is configured to move residue and clods out of the way of the disk openers 113 and the gauge wheels 112 to allow them to operate smoothly and to help eliminate unit vibration or bounce.

In an example, the downforce of the row cleaner 116 can be controlled via another cylinder actuator 124. The fluid system 122 can be used to control fluid flow to and from the cylinder actuator 124 to change the force applied by the row cleaner 116 to the surface 115, and thus change the engagement position of the row cleaner 116.

Soil conditions can vary widely. For instance, the surface engaging machine 100 may be subjected to different soil types: sand, clay, rock, etc. Further, individual row units of the surface engaging machine 100 can each be subjected to different soil conditions. For instance, moisture might not be consistent throughout the surface, e.g., ground in this case, and thus different row units may be subjected to different ground firmness. Further, the ground might be uneven, and thus different row units may be traversing over varying ground heights as the surface engaging machine 100 traverses the field. Thus, it may be desirable to actively control the downforce applied to the gauge wheels (or the row cleaner) of each row unit based on the condition of the soil.

For example, for hard soil or aggressive organic material conditions, it may be desirable to apply a positive downforce by the cylinder actuator 118 on the surface engaging implement 111 or positive downforce to the cylinder actuator 124 on the row cleaner 116. Such positive downforce along with the weight of the surface engaging implement 111 may facilitate achieving a particular surface engagement position. In other examples however, the soil may be soft. In these examples, rather than applying a positive downward force, it may be desirable to have the cylinder actuator 118, 124 apply a low magnitude upward force that is less than the weight of the surface engaging implement 111 or the row cleaner 116. This way, a resultant or effective small downward force that is equal to the difference between the weight of the surface engaging implement 111 or the row cleaner 116 and the upward actuator force is applied downward on the soft soil. In these examples, it may be desirable to control the upward actuator force with high precision to achieve a particular desirable effective downward force.

Figure 2:
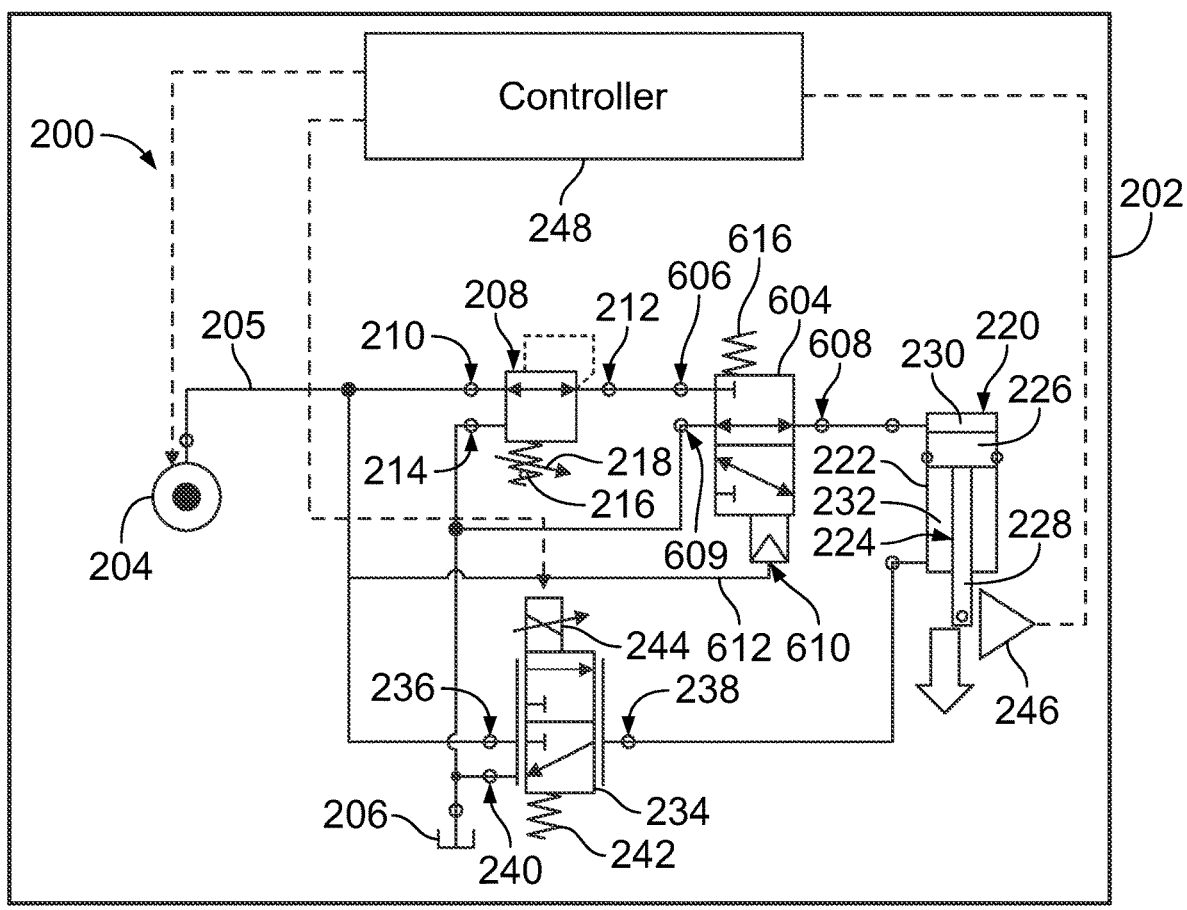
FIG. 2 illustrates a control system of a surface engaging unit, in accordance with an example implementation.

FIG. 2 illustrates a control system 200 of a surface engaging unit 202, in accordance with an example implementation. The surface engaging unit 202 can represent any of the row units 102-110 of the surface engaging machine 100, for example.

The control system 200 includes a source 204 of fluid capable of providing fluid via supply fluid line 205 in a wide range of pressure levels, e.g., 80-5000 pounds per square inch (psi). In other words, the source 204 can be a variable pressure fluid source.

The source 204 of fluid can include a pump, an accumulator, another valve in a fluid system of the machine, a cylinder, etc. In an example, the source 204 can include a fluid flow providing device (e.g., a fixed or variable displacement pump) combined with one or more valves that are configured to be electronically-actuated (e.g., by a controller such as controller 248 described below) to regulate pressure level of fluid provided by the source 204. For example, the controller can be configured to send a signal to a solenoid of a valve to actuate the valve and achieve a particular pressure level for fluid provided by the source 204.

The control system 200 also includes a fluid reservoir 206 that can store fluid at a low pressure level (e.g., atmospheric pressure or 0-50 psi). In an example where the source 204 of fluid includes a pump, such pump can draw fluid from the fluid reservoir 206, then provide pressurized fluid to other components of the control system 200.

The control system 200 includes a pressure control valve 208 that is configured to receive fluid from the source 204. The pressure control valve 208 is configured to maintain fluid at a particular pressure level or within a particular pressure level range downstream of the pressure control valve 208.

As an example, as depicted symbolically in FIG. 2, the pressure control valve 208 can be a pressure reducing-relieving valve. A pressure-reducing valve can provide a steady pressure into a part of the control system 200 that operates at a pressure level that is lower than normal system pressure (e.g., lower than pressure level of fluid provided by the source 204). A pressure reducing valve can be set for a desired downstream pressure within its design limits. For example, the pressure control valve 208 can receive fluid from the source 204 at a pressure level in the range 2800-3000 psi and provide fluid downstream at a reduced pressure level of 600 psi.

A pressure relief valve is a valve used to control or limit the pressure in a system. Pressure might otherwise build up and can cause component or system failure. The pressure control valve 208 combines or integrates a pressure relief function with a pressure reducing function so as to maintain pressure level downstream thereof substantially constant. The term "substantially constant" is used herein to indicate that pressure level can be maintained within a threshold valve (e.g., within 2%-5%) of a desired pressure level. For example, if a desired pressure level is 600 psi, the pressure control valve 208 can maintain pressure level downstream in the range 580-620 psi.

In the example implementation of FIG. 2, the pressure control valve 208 has (i) an inlet port 210 that is fluidly coupled to the source 204, (ii) an outlet port 212 through which fluid is discharged downstream of the pressure control valve 208, and (iii) a drain port 214 that is fluidly coupled to the fluid reservoir 206. The term "fluidly coupled" is used throughout herein to indicate that fluid can flow or be communicated between two fluid passages, chambers, ports, or openings.

In an example, the pressure control valve 208 can be a normally-open pressure control valve configured to reduce a high pressure received at the inlet port 210 to a controlled lower pressure (reduced pressure) at the outlet port 212. The reduced pressure is determined by a biasing force of a spring 216 plus any pressure at the drain port 214. The biasing force of the spring 216 can be adjustable (e.g., manually or electrically) as depicted symbolically by an arrow 218.

The pressure control valve 208 further integrates pressure relief valve function from the reduced pressure at the outlet port 212 to the drain port 214. Particularly, the pressure control valve 208 allows the reduced pressure at the outlet port 212 to remain relatively constant under back flow conditions, e.g., if back flow is received at the outlet port 212 at a higher pressure level than the set reduced pressure level. Such higher pressure level fluid at the outlet port 212 is relieved to the drain port 214 to maintain pressure level at the outlet port 212 substantially constant.

The control system 200 further includes a pilot-operated valve 604. The pilot-operated valve 604 has (i) a first port 606 that is fluidly coupled to the outlet port 212 of the pressure control valve 208, (ii) a second port 608 that is fluidly coupled to a cylinder actuator 220, (iii) a third port 609 that is fluidly coupled to the fluid reservoir 206, and (iv) a pilot port 610 that is fluidly coupled via pilot line 612 to the supply fluid line 205, which receives fluid from the source 204 of fluid. As such, the pilot port 610 is fluidly coupled to the source 204 of fluid.

The pilot-operated valve 604 has a spring 616 that biases a movable element (e.g., a spool, poppet, or piston) within the pilot-operated valve 604 to a position at which fluid at the outlet port 212 of the pressure control valve 208 is blocked, while fluid is drained from the second port 608 to the third port 609 as depicted in FIG. 2. As pressure level of fluid at the pilot port 610 provided from the source 204 reaches a threshold pressure value that overcomes the spring 616, the movable element shifts. As a result, the pilot-operated valve 600 switches to a state in which the first port 606 is fluidly coupled to the second port 608 and fluid flows downstream from the pilot-operated valve 604 to the cylinder actuator 220, while the third port 609 is blocked.

Fluid discharged from the pilot-operated valve 604 via the second port 608 is provided to the cylinder actuator 220. The cylinder actuator 220 represents the cylinder actuator 118 or the cylinder actuator 124, for example. The cylinder actuator 220 includes a cylinder 222 and a piston 224 that is slidably accommodated in the cylinder 222.

The piston 224 includes a piston head 226 and a piston rod 228 extending from the piston head 226 along a central longitudinal axis direction of the cylinder 222. The piston rod 228 can be coupled to the surface engaging implement 111 (e.g., to the gauge wheels 112) of the row unit 102 of the surface engaging machine 100, for example.

The piston head 226 divides the internal space of the cylinder 222 into a first chamber 230 and a second chamber 232. The first chamber 230 can be referred to as a head chamber or cap chamber, whereas the second chamber 232 can be referred to as a rod chamber. The second port 608 of the pilot-operated valve 604 is fluidly coupled to the first chamber 230 of the cylinder actuator 220 as shown in FIG. 2.

When the pilot-operated valve 604 is actuated via a pilot signal at the pilot port 610, fluid at the outlet port 212 of the pressure control valve 208 flows through the first port 606, then through the pilot-operated valve 604, to the second port 608 thereof, then to the first chamber 230 of the cylinder actuator 220. Thus, fluid a particular pressure level (e.g., 600 psi) from the pressure control valve 208 is provided to the first chamber 230.

Fluid in the first chamber 230 applies a force on the piston 224 in a first direction (e.g., downward in FIG. 2). Assuming that a diameter of the piston head 226 is $D_1$, then a surface area of the piston head 226 on which fluid in the first chamber 230 acts can be determined as $$A_1 = \pi \frac{D_1^2}{4}.$$

Assuming pressure level of fluid in the first chamber 230 (which is controlled by the pressure control valve 208) is $P_1$, then a fluid force $F_1$ that the fluid in the first chamber 230 applies on the piston 224 can be determined as $$F_1 = P_1 \cdot A_1 = P_1 \cdot \pi \frac{D_1^2}{4}.$$

Because the pressure control valve 208 causes $P_1$ to be a substantially constant pressure level, the force $F_1$ is a substantially constant fluid force.

The control system 200 further includes a proportional control valve 234 that can control fluid flow and pressure level in the second chamber 232. The proportional control valve 234 has (i) an inlet port 236 that is fluidly coupled to the source 204 of fluid (via the supply fluid line 205), (ii) an outlet port 238 that is fluidly coupled to the second chamber 232 of the cylinder actuator 220, and (iii) a return port 240 that is fluidly coupled to the fluid reservoir 206.

The proportional control valve 234 can include movable element (e.g., spool, poppet, or piston) disposed therein. The position of the movable element within the valve controls fluid flow rate and direction through the proportional control valve 234.

The proportional control valve 234 can have a spring 242 that biases the movable element to an unactuated position. In the unactuated position, the proportional control valve 234 blocks the inlet port 236 and allows fluid flow from the outlet port 238 to the return port 240 as depicted schematically in FIG. 2. The term "block" is used throughout herein to indicate substantially preventing fluid flow except for minimal or leakage flow of drops per minute, for example.

The proportional control valve 234 can be electrically-actuated via a solenoid actuator 244. For example, the control system 200 includes a controller 248 configured to send an electric valve command signal to the solenoid actuator 244 to actuate the proportional control valve 234. The controller 248 can include one or more processors or microprocessors and may include data storage (e.g., memory, transitory computer-readable medium, non-transitory computer-readable medium, etc.). The data storage may have stored thereon instructions that, when executed by the one or more processors of the controller 248, cause the controller 248 to perform operations described herein.

The solenoid actuator 244 receives a valve command signal from the controller 248, and responsively changes the position of the movable element of the proportional control valve 234 to an actuated position. In the actuated state, the proportional control valve 234 allows fluid flow from the inlet port 236 to the outlet port 238, and blocks the return port 240.

Particularly, as the movable element of the proportional control valve 234 moves, a variable orifice or flow area is formed within the proportional control valve 234 to fluidly couple the inlet port 236 to the outlet port 238. The size of the flow area is based on the magnitude of the valve command signal (e.g., the magnitude of the voltage or current of the valve command signal). For example, the lager the magnitude of the valve command signal, the larger the flow area (the less restrictive the proportional control valve 234 becomes and the smaller the pressure drop or differential across the proportional control valve 234). In this case, if the source 204 provides fluid at a particular pressure level to the inlet port 236, then pressure level at the outlet port 238 and in the second chamber 232 increases as the flow area increases.

Conversely, the smaller the magnitude of the valve command signal, the smaller the flow area of the proportional control valve 234 (the more restrictive the proportional control valve 234 becomes and the lager the pressure differential across the proportional control valve 234). In this case, pressure level at the outlet port 238 and in the second chamber 232 decreases as the flow area decreases.

Fluid in the second chamber 232 applies a force on the piston 224 in a second direction (e.g., upward in FIG. 2) opposite the first direction. Assuming that a diameter of the piston rod 228 is $D_2$, then a surface area of the piston 224 on which fluid in the second chamber 232 acts is the annular area that can be determined as $$A_2 = \pi \frac{D_1^2}{4} - \pi \frac{D_2^2}{4}.$$

Assuming pressure level of fluid in the second chamber 232 (which is controlled by the proportional control valve 234) is $P_2$, then a respective fluid force $F_2$ that the fluid in the second chamber 232 applies on the piston 224 can be determined as $$F_2 = P_2 \cdot A_2 = P_2 \cdot \left( \pi \frac{D_1^2}{4} - \pi \frac{D_2^2}{4} \right).$$

Thus, the resultant or net fluid force acting on the piston 224 can be determined as $F_{net}=F_1-F_2=P_1 \cdot A_1-P_2 \cdot A_2$. In the example implementation shown in FIG. 2, when the source 204 provides high pressure fluid that actuates the pilot-operated valve 604 via a fluid signal at the pilot port 610, the pressure level in the first chamber 230, and thus the force $F_1$, is substantially constant due to the pressure control valve 208. By varying the valve command to the proportional control valve 234, the pressure level in the second chamber 232 and the force $F_2$ can be changed to adjust the net fluid force $F_{net}$. The net fluid force $F_{net}$ applied to the piston 224 is transmitted to the implement (e.g., the surface engaging implement 111 and thus the gauge wheels 112) coupled to the piston 224, and the implement then applies the force to the surface. With this configuration, the downward force or the net fluid force $F_{net}$ that the piston 224 applies to the surface engaging implement (e.g., to the gauge wheels 112 or the associated seed opener) can be adjusted by varying the valve command to the proportional control valve 234 until a desired downward force is achieved.

Particularly, in the example implementation of FIG. 2, a substantially constant force $F_1$ is applied to the piston 224 downward given that the pressure control valve 208 maintains pressure level in the first chamber 230 substantially constant (e.g., 600 psi). On the other hand, the valve command signal to the proportional control valve 234 varies the pressure level in the second chamber 232.

For instance, if the source 204 of provides at a particular flow rate and at a pressure level of 3000 psi, the proportional control valve 234 can vary the pressure in the second chamber 232 proportionally between 0 psi (when the proportional control valve 234 is unactuated and blocks fluid flow from the inlet port 236 to the outlet port 238) to about 3000 psi (when the proportional control valve 234 is fully open). Thus, the force $F_2$ applied to the piston 224 upward can vary between a low value and a high value. With this configuration, the net fluid force $F_{net}$ can vary in a continuum between a net downward force and a net upward force based on the magnitude of the valve command signal to the solenoid actuator 244.

The above-described mode of operation where the source 204 provides high pressure fluid and actuates the pilot-operated valve 604 such that fluid from the source 204 is communicated via the pressure control valve 208 and the pilot-operated valve 604 to the first chamber 230 may be suited for achieving large forces, e.g., up to 300 pound-force (lbf) downward force or up to 200 lbf upward force. Such forces may be appropriate for hard soils, for example. In other examples, however, it may be desirable to apply a smaller upward fluid force (e.g., in the 20-100 lbf) range, such that the net force resultant from the weight of the implement combined with such smaller upward fluid force is a small downward force that is appropriate for softer soil.

The proportional control valve 234 may be characterized in having a particular level of hysteresis. Particularly, for the same electric command provided to the solenoid actuator 244 of the proportional control valve 234, different flow rates may be achieved depending on the direction in which the movable element of the proportional control valve 234. As an example for illustration, the difference can be up to 4%.

Such hysteresis can affect the preciseness with which the net fluid force of the piston 224 is controlled, particularly when a small force is desired. To enhance the preciseness of achieving a smaller force, the control system 200 can be operated in a state where the source 204 is controlled to generate fluid at a low pressure (e.g., below a threshold pressure value in the 80-95 psi range), which is not sufficient to actuate the pilot-operated valve 604. As such, the pilot-operated valve 604 operates in the state depicted in FIG. 2 where the first port 606 is blocked, and the first chamber 230 is fluidly coupled to the fluid reservoir 206. As a result, the force applied by fluid in the first chamber 230 on the piston 224 in a downward direction is substantially zero.

At the same time, in one example, the proportional control valve 234 can be actuated via a maximum command such that it is fully open, and pressure level of fluid provided to the second chamber 232 is controlled by the source 204 rather than the proportional control valve 234. The pressurized fluid from the source 204, which can be precisely controlled via the controller 248, is used to achieve a particular small upward force on the piston 224, opposite the weight of the implement acting in a downward direction on the piston 224. This way, a more precise force (i.e., force achievable with high resolution) in the low force ranges (e.g., 20 lbf-100 lbf) can be achieved as the hysteresis of the proportional control valve 234 might not affect operation. In another example, the source 204 can be controlled by the controller 248 to provide fluid at a pressure level just under the threshold pressure value, and the proportional control valve 234 can be actuated proportionally by the controller 248 to control pressure level of fluid provided to the second chamber 232, and thus control the upward force.

Thus, the control system 200 can be considered a dual mode force control system. In a first mode of operation, the controller 248 can control the source 204 to provide high pressure fluid (e.g., in the range 2800-3000 psi range) that actuates the pilot-operated valve 604, causing fluid at a particular pressure level controlled by the pressure control valve 208 to flow to the first chamber 230 and apply a fluid force downward on the piston 224.

The controller 248 also actuates the proportional control valve 234 to allow fluid to flow from the source 204 to the second chamber 232 and apply an upward fluid force, the magnitude of which is related to the magnitude of the command provided to the solenoid actuator 244 by the controller 248. In this mode of operation, the cylinder actuator 220 operates as a double acting actuator with fluid forces applied to both sides of the piston 224, and a net fluid force is applied to the piston 224. This first mode of operation may be suitable for achieving a large upward or downward force as mentioned above.

In the second mode of operation, the controller 248 can control the source 204 to provide fluid at a pressure level below a threshold pressure value (e.g., fluid at a pressure level of 80-95 psi) that is not sufficient to actuate the pilot-operated valve 604. Rather, the pilot-operated valve 604 operates in the state depicted in FIG. 2 to fluidly couple the first chamber 230 to the fluid reservoir 206, and thus have a substantially zero fluid force applied to the piston 224 in a downward direction. Thus, in this mode of operation, the cylinder actuator 220 operates as a single acting actuator where fluid force is acting in one direction (e.g., upward) opposed by the weight of the implement coupled to the piston 224.

In an example, while operating in the second mode of operation, the controller 248 actuates the proportional control valve 234 via a large magnitude command such that the proportional control valve 234 is fully open, and fluid from the source 204 at the low pressure level flows substantially unimpeded (e.g., with minimal pressure drop) by the proportional control valve 234 to the second chamber 232 and apply an upward fluid force, the magnitude of which is determined with high resolution via the magnitude of the pressure level of fluid provided by the source 204. Alternatively, the source 204 can be controlled by the controller 248 to provide fluid at a pressure level just below the threshold pressure value, and the proportional control valve 234 can be actuated proportionally by the controller 248 to control pressure level of fluid provided to the second chamber 232 with high resolution. This way, a high resolution small fluid upward force (e.g., 20-100 lbf) is applied to the piston 224 (opposed by the weight of the implement coupled to the piston 224), which may be suitable for soft soils or similar applications.

To facilitate achieving a desired net force, the cylinder actuator 220 can include one or more sensors configured to provide information indicative of the actual net force $F_{net}$ applied to the piston 224. For example, the cylinder actuator 220 can include a force sensor 246 represented schematically in FIG. 2. Various types of force sensors or force transducers can be used. Example force sensors include a load cell, a strain gauge force sensor, a piezoelectric force sensor, an inductive force sensor, a capacitive force sensor, a magnetostrictive force sensors, pressure sensors in each of the chambers 230, 232, etc. Thus, the term "force sensor" is used throughout herein to indicate one or more sensors capable of providing force sensor information that can be used to determine the actual force acting on the piston 224.

In the example implementation of FIG. 2, the force sensor 246 can be coupled to the piston rod 228 to which a machine implement (seed opener or gauge wheels) is attached. The controller 248 is in communication with, and receives sensor information from, the force sensor 246, and accordingly determines the net force $F_{net}$ applied to the piston 224 (and thus applied by the implement coupled to the piston 224 to the surface). In examples, the force sensor 246 or an additional force sensor can be coupled to the gauge wheels 112 so that the force sensor can account for differences in weight of the row unit, which can vary based on brand, whether full seed load is included, etc.

The controller 248 can receive input information including input commands indicating a target net force $F_{net}$, and also receives sensor information from the force sensor 246. In response, the controller 248 provides a valve command signal to the proportional control valve 234 (e.g., to the solenoid actuator 244) and/or the source 204 to vary the pressure level in the second chamber 232 until the desired net force is achieved.

Particularly, the controller 248 can compare the actual net force $F_{net}$ indicated by the force sensor 246 to a target or desired net force, and then adjust the valve command signal (i.e., adjust the magnitude of the electric current or voltage) sent to the solenoid actuator 244 of the proportional control valve 234 or sent to the source 204 to achieve the target net force. As such, the controller 248 can implement a closed-loop feedback control system to achieve the target net force based on the feedback signal from the force sensor 246.

It should be understood that several variations can be implemented to the control system 200. For example, in the example implementation of FIG. 2, the pilot-operated valve 604 is disposed downstream from the pressure control valve 208. In other words, the outlet port 212 of the pressure control valve 208 is fluidly coupled to the first port 606 (e.g., inlet port) of the pilot-operated valve 604. In other example implementations, however, the pilot-operated valve 604 can be disposed upstream of the pressure control valve 208 such that the pilot-operated valve 604 is interposed between the source 204 and the pressure control valve 208.

Figure 3:
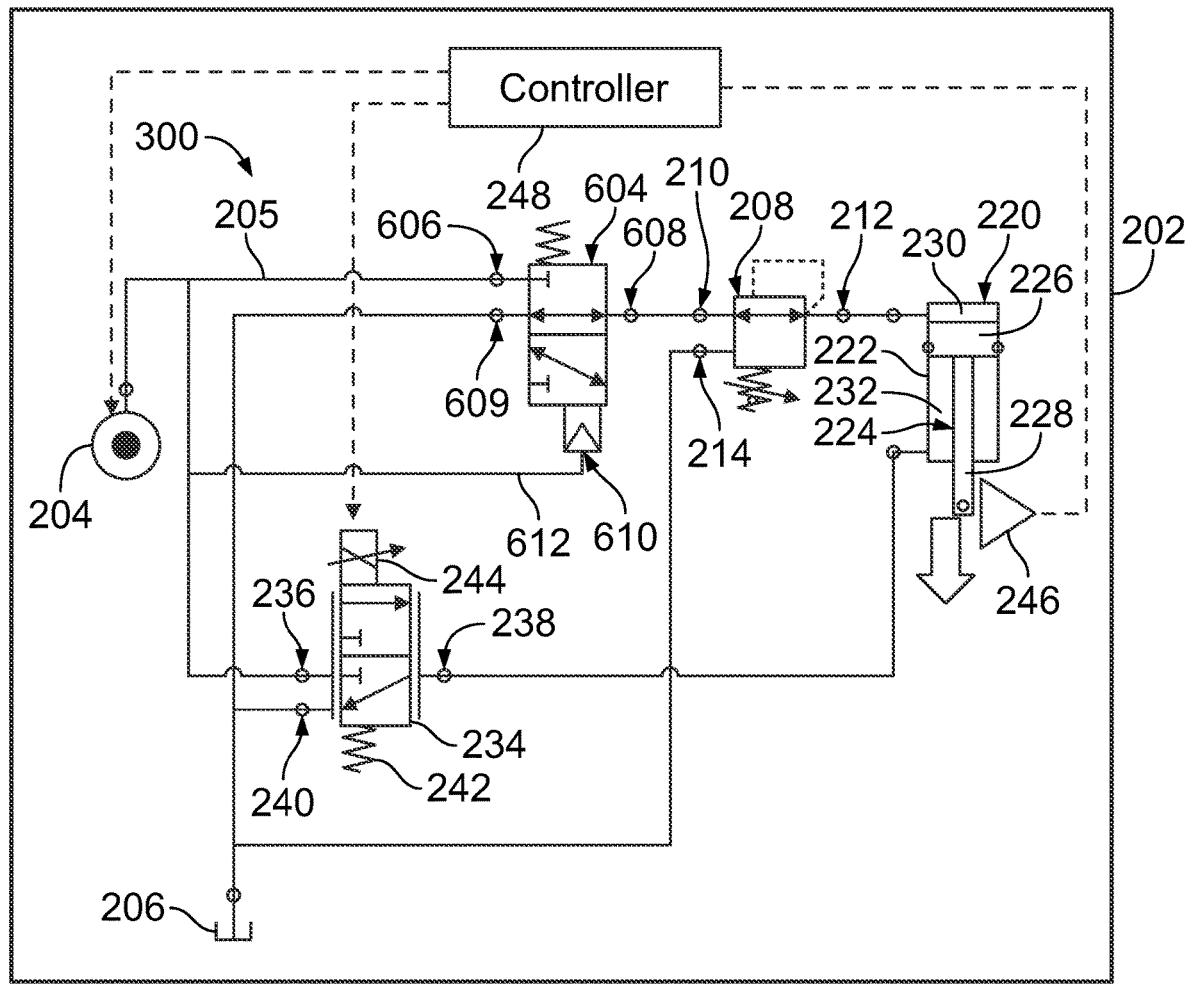
FIG. 3 illustrates another control system of a surface engaging unit, in accordance with an example implementation.

FIG. 3 illustrates a control system 300 of the surface engaging unit 202, in accordance with an example implementation. The control system 300 has the same components of the control system 200 and such components are labeled with the same reference numbers.

In the control system 200, the pilot-operated valve 604 is disposed downstream from the pressure control valve 208. In the control system 300, the pilot-operated valve 604 is disposed upstream from the pressure control valve 208. Thus, with the configuration of the control system 300, the first port 606 of the pilot-operated valve 604 is fluidly coupled to the source 204 via the supply fluid line 205, the second port 608 is fluidly coupled to the inlet port 210 of the pressure control valve 208, and the third port 609 is fluidly coupled to the fluid reservoir 206.

The pressure control valve 208 is disposed downstream from the pilot-operated valve 604, and is thus interposed between the pilot-operated valve 604 and the cylinder actuator 220. As such, the outlet port 212 of the pressure control valve 208 is directly fluidly coupled to the first chamber 230 of the cylinder actuator 220.

However, the control system 300 is configured to operate in a similar manner to the control system 200 and is capable of operating in the same two modes described above. Particularly, in the first mode of operation, the controller 248 can control the source 204 to provide high pressure fluid (e.g., 3000 psi) that actuates the pilot-operated valve 604 (via the pilot line 612 and the pilot port 610), causing fluid to be provided to the pressure control valve 208, which then operates to provide fluid at a particular pressure level to the first chamber 230. Such fluid applies a fluid force downward on the piston 224. The controller 248 also actuates the proportional control valve 234 to allow fluid to flow from the source 204 to the second chamber 232 and apply an upward force, the magnitude of which is related to the magnitude of the command provided to the solenoid actuator 244 by the controller 248. This way, a net fluid force is applied to the piston 224. This first mode of operation may be suitable for achieving a large upward or downward force as mentioned above.

In the second mode of operation, the controller 248 can control the source 204 to provide fluid at a pressure level below the threshold pressure value (e.g., fluid at a pressure level of 80-95 psi) that is not sufficient to actuate the pilot-operated valve 604. Rather, the pilot-operated valve 604 operates in the state depicted in FIG. 3 to fluidly couple the first chamber 230 to the fluid reservoir 206, and thus have a substantially zero fluid force applied to the piston 224 in a downward direction.

In an example, while operating in the second mode of operation, the controller 248 actuates the proportional control valve 234 via a large magnitude command such that the proportional control valve 234 is fully open, and fluid from the source 204 at the low pressure level flows substantially unimpeded (e.g., with minimal pressure drop) by the proportional control valve 234 to the second chamber 232 and apply an upward force, the magnitude of which is determined with high resolution via the magnitude of the pressure level of fluid provided by the source 204. In another example, the source 204 can be controlled by the controller 248 to provide fluid at a pressure level just under the threshold pressure value, and the proportional control valve 234 can be actuated proportionally by the controller 248 to control pressure level of fluid provided to the second chamber 232, and thus control the upward force. This way, a high resolution small net force (e.g., 20-100 lbf) is applied to the piston 224, which may be suitable for soft soils or similar applications.

Thus, the components of the control systems 200, 300 can be arranged differently, while maintaining the same principles of operation, i.e., the ability of the control system to operate in the two modes of operation described above. For instance, in other example implementations, the pressure control valve 208 and the pilot-operated valve 604 can be connected to the second chamber 232, while the proportional control valve 234 is connected to the first chamber 230. This implementation might be desirable in applications where a low magnitude piston extension force is desired rather than a low magnitude piston retraction force.

FIG. 4 is a flowchart of a method 400 of operating a control system, in accordance with an example implementation. For example, the method 400 can be implemented by the controller 248 to operate the control system 200 or the control system 300.

The method 400 may include one or more operations, or actions as illustrated by one or more of blocks 402-404. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 400 and other processes and operations disclosed herein, the flowchart shows operation of one possible implementation of present examples. In this regard, each block may represent a module, a segment, or a portion of program code, which includes one or more instructions executable by a processor (e.g., a processor of the controller 248) or the controller 248 for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the method 400 and other processes and operations disclosed herein, one or more blocks in FIG. 4 may represent circuitry or digital logic that is arranged to perform the specific logical operations in the process.

At block 402, the method 400 includes operating the control system 200, 300 of the surface engaging unit 202 in a first mode of operation. The control system 200, 300 comprises: (i) the source 204 of fluid, (ii) the cylinder actuator 220 comprising: the cylinder 222, and the piston 224 movable within the cylinder 222 and coupled to the surface engaging implement 111 of the surface engaging unit 202, wherein the piston 224 divides an internal space of the cylinder 222 into the first chamber 230 and the second chamber 232, (iii) the pressure control valve 208, (iv) the pilot-operated valve 604 comprising the pilot port 610 that is fluidly coupled to the source 204 of fluid, and (v) the proportional control valve 234 configured to control fluid flow from the source 204 of fluid to the second chamber 232.

Operating the control system 200, 300 in the first mode of operation comprises: providing fluid from the source 204 above a threshold pressure value, which actuates the pilot-operated valve 604 via a pilot signal to the pilot port 610, thereby fluidly coupling the source 204 through the pressure control valve 208 and the pilot-operated valve 604 to the first chamber 230, and actuating the proportional control valve 234 to fluidly couple the source 204 of fluid through the proportional control valve 234 to the second chamber 232.

At block 404, the method 400 includes operating the control system 200, 300 in a second mode of operation. Operating the control system 200, 300 in the second mode of operation comprises: causing the source 204 to provide fluid at a pressure level below the threshold pressure value, thereby causing the pilot-operated valve 604 to be in an unactuated state, blocking fluid flow from the source 204 to the first chamber 230, and actuating the proportional control valve 234 to fluidly couple the source 204 through the proportional control valve 234 to the second chamber 232.

The method 400 can include any further steps described throughout his disclosure.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiments (EEEs) listed below.

EEE 1 is a control system comprising: a source of fluid; a cylinder actuator having: (i) a cylinder, and (ii) a piston movable within the cylinder and dividing an internal space of the cylinder into a first chamber and a second chamber; a pressure control valve; a pilot-operated valve having a pilot port that is fluidly coupled to the source; and a proportional control valve, wherein the pilot-operated valve operates in: (i) a first mode of operation, wherein the source provides fluid at a pressure level above a threshold pressure value, which actuates the pilot-operated valve via a pilot signal to the pilot port, thereby fluidly coupling the source through the pressure control valve and the pilot-operated valve to the first chamber, while fluidly coupling the source through the proportional control valve to the second chamber, and (ii) a second mode of operation, wherein the source provides fluid at a pressure level below the threshold pressure value, thereby causing the pilot-operated valve to be in an unactuated state, blocking fluid flow from the source through the pressure control valve to the first chamber, while fluidly coupling the source through the proportional control valve to the second chamber.

EEE 2 is the control system of EEE 1, further comprising: a fluid reservoir, wherein the pressure control valve is a pressure reducing-relieving valve having: (i) an inlet port, (ii) an outlet port, and (iii) a drain port that is fluidly coupled to the fluid reservoir, wherein the pressure control valve is configured to reduce pressure level of fluid received at the inlet port and provide fluid having a reduced pressure level via the outlet port to the first chamber when the pilot-operated valve is actuated, and wherein the pressure control valve is configured to relieve fluid at the outlet port to the drain port when pressure level at the outlet port exceeds the reduced pressure level.

EEE 3 is the control system of any of EEEs 1-2, wherein the pilot-operated valve is disposed downstream from the pressure control valve, and interposed between the pressure control valve and the first chamber of the cylinder actuator, such that fluid discharged from the pressure control valve flows through the pilot-operated valve to the first chamber when the pilot-operated valve is actuated via the pilot signal.

EEE 4 is the control system of any of EEEs 1-3, wherein the pilot-operated valve is disposed upstream of the pressure control valve, and interposed between the source of fluid and the pressure control valve, such that when the pilot-operated valve is actuated via the pilot signal, the pilot-operated valve allows fluid flow from the source of fluid to the pressure control valve, which then provides fluid to the first chamber.

EEE 5 is the control system of any of EEEs 1-4, further comprising: a fluid reservoir, wherein in the second mode of operation, the first chamber is fluidly coupled to the fluid reservoir.

EEE 6 is the control system of any of EEEs 1-5, further comprising: a force sensor coupled to the piston and configured to provide force sensor information indicative of an actual force applied by the piston; and a controller performing operations including: receiving the force sensor information from the force sensor; and based on the force sensor information, sending a valve command signal to the proportional control valve to vary pressure level of fluid provided to the second chamber, thereby changing fluid force applied to the piston when the control system is in the first mode of operation.

EEE 7 is the control system of EEE 6, wherein the controller performs further operations including: sending a valve command signal to the proportional control valve that renders the proportional control valve fully open; and sending a signal to the source of fluid to vary pressure level provided by the source to the second chamber when the control system is in the second mode of operation.

EEE 8 is a surface engaging machine comprising: a plurality of row units, wherein at least one row unit of the plurality of row units has a surface engaging implement; and a control system having: a source of fluid, a cylinder actuator having: (i) a cylinder, and (ii) a piston movable within the cylinder and coupled to the surface engaging implement, wherein the piston divides an internal space of the cylinder into a first chamber and a second chamber, a pressure control valve, a pilot-operated valve having a pilot port that is fluidly coupled to the source of fluid, and a proportional control valve, wherein the pilot-operated valve operates in: (i) a first mode of operation, wherein the source provides fluid at a pressure level above a threshold pressure value, which actuates the pilot-operated valve via a pilot signal to the pilot port, thereby fluidly coupling the source through the pressure control valve and the pilot-operated valve to the first chamber at, while fluidly coupling the source through the proportional control valve to the second chamber, and (ii) a second mode of operation, wherein the source provides fluid at a pressure level below the threshold pressure value, thereby causing the pilot-operated valve to be in an unactuated state, blocking fluid flow from the source through the pressure control valve to the first chamber, while fluidly coupling the source through the proportional control valve to the second chamber.

EEE 9 is the surface engaging machine of EEE 8, further comprising: a fluid reservoir, wherein the pressure control valve is a pressure reducing-relieving valve having: (i) an inlet port, (ii) an outlet port, and (iii) a drain port that is fluidly coupled to the fluid reservoir, wherein the pressure control valve is configured to reduce pressure level of fluid received at the inlet port and provide fluid having a reduced pressure level via the outlet port to the first chamber when the pilot-operated valve is actuated, and wherein the pressure control valve is configured to relieve fluid at the outlet port to the drain port when pressure level at the outlet port exceeds the reduced pressure level.

EEE 10 is the surface engaging machine of any of EEEs 8-9, wherein the pilot-operated valve is disposed downstream from the pressure control valve, and interposed between the pressure control valve and the first chamber of the cylinder actuator, such that fluid discharged from the pressure control valve flows through the pilot-operated valve to the first chamber when the pilot-operated valve is actuated via the pilot signal.

EEE 11 is the surface engaging machine of any of EEEs 8-10, wherein the pilot-operated valve is disposed upstream of the pressure control valve, and interposed between the source of fluid and the pressure control valve, such that when the pilot-operated valve is actuated via the pilot signal, the pilot-operated valve allows fluid flow from the source of fluid to the pressure control valve, which then provides fluid at a substantially constant pressure level to the first chamber.

EEE 12 is the surface engaging machine of any of EEEs 8-11, wherein the control system further comprises: a fluid reservoir, wherein in the second mode of operation, the first chamber is fluidly coupled to the fluid reservoir.

EEE 13 is the surface engaging machine of any of EEEs 8-12, further comprising: a force sensor coupled to the piston and configured to provide force sensor information indicative of an actual force applied by the piston on the surface engaging implement; and a controller performing operations including: receiving the force sensor information from the force sensor; and based on the force sensor information, sending a valve command signal to the proportional control valve to vary pressure level of fluid provided to the second chamber, thereby changing fluid force applied to the piston when the control system is in the first mode of operation.

EEE 14 is the surface engaging machine of EEE 13, wherein the controller performs further operations including: sending a valve command signal to the proportional control valve that renders the proportional control valve fully open; and sending a signal to the source of fluid to vary pressure level provided by the source to the second chamber when the control system is in the second mode of operation.

EEE 15 is a method comprising: operating a control system of a surface engaging unit in a first mode of operation, wherein the control system has: (i) a source of fluid, (ii) a cylinder actuator having: a cylinder, and a piston movable within the cylinder and coupled to a surface engaging implement of the surface engaging unit, wherein the piston divides an internal space of the cylinder into a first chamber and a second chamber, (iii) a pressure control valve, (iv) a pilot-operated valve having a pilot port that is fluidly coupled to the source of fluid, and (v) a proportional control valve, wherein operating the control system in the first mode of operation comprises: providing fluid from the source at a pressure level above a threshold pressure value, which actuates the pilot-operated valve via a pilot signal to the pilot port, thereby fluidly coupling the source through the pressure control valve and the pilot-operated valve to the first chamber, and actuating the proportional control valve to fluidly couple the source of fluid through the proportional control valve to the second chamber; and operating the control system in a second mode of operation, wherein operating the control system in the second mode of operation comprises: causing the source to provide fluid at a pressure level below the threshold pressure value, thereby causing the pilot-operated valve to be in an unactuated state, blocking fluid flow from the source to the first chamber, and actuating the proportional control valve to fluidly couple the source through the proportional control valve to the second chamber.

EEE 16 is the method of EEE 15, wherein the pilot-operated valve is disposed downstream from the pressure control valve, and interposed between the pressure control valve and the first chamber of the cylinder actuator, wherein operating the control system in the first mode of operation includes: actuating the pilot-operated valve via the pilot signal, thereby causing fluid discharged from the pressure control valve to flow through the pilot-operated valve to the first chamber.

EEE 17 is the method of any of EEEs 15-16, wherein the pilot-operated valve is disposed upstream of the pressure control valve, and interposed between the source of fluid and the pressure control valve, wherein operating the control system in the first mode of operation includes: actuating the pilot-operated valve via the pilot signal, thereby causing the pilot-operated valve to allow fluid flow from the source of fluid to the pressure control valve, which then provides fluid at a substantially constant pressure level to the first chamber.

EEE 18 is the method of any of EEEs 15-17, wherein the control system further comprises a force sensor coupled to the piston and configured to provide force sensor information indicative of an actual force applied by the piston on the surface engaging implement.

EEE 19 is the method of EEE 18, further comprising: receiving the force sensor information from the force sensor; and based on the force sensor information, sending a valve command signal to the proportional control valve to vary pressure level of fluid provided to the second chamber, thereby changing fluid force applied to the piston when the control system is in the first mode of operation.

EEE 20 is the method of EEE 19, wherein operating the control system in the second mode of operation includes: sending a valve command signal to the proportional control valve that renders the proportional control valve fully open; and sending a signal to the source of fluid to vary pressure level provided by the source to the second chamber.

What is claimed is:

1. A control system comprising:
   a source of fluid;
   a cylinder actuator having: (i) a cylinder, and (ii) a piston movable within the cylinder and dividing an internal space of the cylinder into a first chamber and a second chamber;
   a pressure control valve;
   a pilot-operated valve having a pilot port that is fluidly coupled to the source; and
   a proportional control valve, wherein the pilot-operated valve operates in: (i) a first mode of operation, wherein the source provides fluid at a pressure level above a threshold pressure value, which actuates the pilot-operated valve via a pilot signal to the pilot port, thereby fluidly coupling the source through the pressure control valve and the pilot-operated valve to the first chamber, while fluidly coupling the source through the proportional control valve to the second chamber, and (ii) a second mode of operation, wherein the source provides fluid at a pressure level below the threshold pressure value, thereby causing the pilot-operated valve to be in an unactuated state, blocking fluid flow from the source through the pressure control valve to the first chamber, while fluidly coupling the source through the proportional control valve to the second chamber.

2. The control system of claim 1, further comprising:
   a fluid reservoir, wherein the pressure control valve is a pressure reducing-relieving valve having: (i) an inlet port, (ii) an outlet port, and (iii) a drain port that is fluidly coupled to the fluid reservoir, wherein the pressure control valve is configured to reduce pressure level of fluid received at the inlet port and provide fluid having a reduced pressure level via the outlet port to the first chamber when the pilot-operated valve is actuated, and wherein the pressure control valve is configured to relieve fluid at the outlet port to the drain port when pressure level at the outlet port exceeds the reduced pressure level.

3. The control system of claim 1, wherein the pilot-operated valve is disposed downstream from the pressure control valve, and interposed between the pressure control valve and the first chamber of the cylinder actuator, such that fluid discharged from the pressure control valve flows through the pilot-operated valve to the first chamber when the pilot-operated valve is actuated via the pilot signal.

4. The control system of claim 1, wherein the pilot-operated valve is disposed upstream of the pressure control valve, and interposed between the source of fluid and the pressure control valve, such that when the pilot-operated valve is actuated via the pilot signal, the pilot-operated valve allows fluid flow from the source of fluid to the pressure control valve, which then provides fluid to the first chamber.

5. The control system of claim 1, further comprising:
   a fluid reservoir, wherein in the second mode of operation, the first chamber is fluidly coupled to the fluid reservoir.

6. The control system of claim 1, further comprising:
   a force sensor coupled to the piston and configured to provide force sensor information indicative of an actual force applied by the piston; and
   a controller performing operations including:
      receiving the force sensor information from the force sensor; and
      based on the force sensor information, sending a valve command signal to the proportional control valve to vary pressure level of fluid provided to the second chamber, thereby changing fluid force applied to the piston when the control system is in the first mode of operation.

7. The control system of claim 6, wherein the controller performs further operations including:
   sending a valve command signal to the proportional control valve that renders the proportional control valve fully open; and
   sending a signal to the source of fluid to vary pressure level provided by the source to the second chamber when the control system is in the second mode of operation.

8. A surface engaging machine comprising:
   a plurality of row units, wherein at least one row unit of the plurality of row units has a surface engaging implement; and
   a control system having:
      a source of fluid,
      a cylinder actuator having: (i) a cylinder, and (ii) a piston movable within the cylinder and coupled to the surface engaging implement, wherein the piston divides an internal space of the cylinder into a first chamber and a second chamber,
      a pressure control valve,
      a pilot-operated valve having a pilot port that is fluidly coupled to the source of fluid, and
      a proportional control valve, wherein the pilot-operated valve operates in: (i) a first mode of operation, wherein the source provides fluid at a pressure level above a threshold pressure value, which actuates the pilot-operated valve via a pilot signal to the pilot port, thereby fluidly coupling the source through the pressure control valve and the pilot-operated valve to the first chamber at, while fluidly coupling the source through the proportional control valve to the second chamber, and (ii) a second mode of operation, wherein the source provides fluid at a pressure level below the threshold pressure value, thereby causing the pilot-operated valve to be in an unactuated state, blocking fluid flow from the source through the pressure control valve to the first chamber, while fluidly coupling the source through the proportional control valve to the second chamber.

9. The surface engaging machine of claim 8, further comprising:
a fluid reservoir, wherein the pressure control valve is a pressure reducing-relieving valve having: (i) an inlet port, (ii) an outlet port, and (iii) a drain port that is fluidly coupled to the fluid reservoir, wherein the pressure control valve is configured to reduce pressure level of fluid received at the inlet port and provide fluid having a reduced pressure level via the outlet port to the first chamber when the pilot-operated valve is actuated, and wherein the pressure control valve is configured to relieve fluid at the outlet port to the drain port when pressure level at the outlet port exceeds the reduced pressure level.

10. The surface engaging machine of claim 8, wherein the pilot-operated valve is disposed downstream from the pressure control valve, and interposed between the pressure control valve and the first chamber of the cylinder actuator, such that fluid discharged from the pressure control valve flows through the pilot-operated valve to the first chamber when the pilot-operated valve is actuated via the pilot signal.

11. The surface engaging machine of claim 8, wherein the pilot-operated valve is disposed upstream of the pressure control valve, and interposed between the source of fluid and the pressure control valve, such that when the pilot-operated valve is actuated via the pilot signal, the pilot-operated valve allows fluid flow from the source of fluid to the pressure control valve, which then provides fluid at a substantially constant pressure level to the first chamber.

12. The surface engaging machine of claim 8, wherein the control system further comprises:
a fluid reservoir, wherein in the second mode of operation, the first chamber is fluidly coupled to the fluid reservoir.

13. The surface engaging machine of claim 12, further comprising:
a force sensor coupled to the piston and configured to provide force sensor information indicative of an actual force applied by the piston on the surface engaging implement; and
a controller performing operations including:
receiving the force sensor information from the force sensor; and
based on the force sensor information, sending a valve command signal to the proportional control valve to vary pressure level of fluid provided to the second chamber, thereby changing fluid force applied to the piston when the control system is in the first mode of operation.

14. The surface engaging machine of claim 13, wherein the controller performs further operations including:
sending a valve command signal to the proportional control valve that renders the proportional control valve fully open; and
sending a signal to the source of fluid to vary pressure level provided by the source to the second chamber when the control system is in the second mode of operation.

15. A method comprising:
operating a control system of a surface engaging unit in a first mode of operation, wherein the control system has: (i) a source of fluid, (ii) a cylinder actuator having: a cylinder, and a piston movable within the cylinder and coupled to a surface engaging implement of the surface engaging unit, wherein the piston divides an internal space of the cylinder into a first chamber and a second chamber, (iii) a pressure control valve, (iv) a pilot-operated valve having a pilot port that is fluidly coupled to the source of fluid, and (v) a proportional control valve, wherein operating the control system in the first mode of operation comprises:
providing fluid from the source at a pressure level above a threshold pressure value, which actuates the pilot-operated valve via a pilot signal to the pilot port, thereby fluidly coupling the source through the pressure control valve and the pilot-operated valve to the first chamber, and
actuating the proportional control valve to fluidly couple the source of fluid through the proportional control valve to the second chamber; and
operating the control system in a second mode of operation, wherein operating the control system in the second mode of operation comprises:
causing the source to provide fluid at a pressure level below the threshold pressure value, thereby causing the pilot-operated valve to be in an unactuated state, blocking fluid flow from the source to the first chamber, and
actuating the proportional control valve to fluidly couple the source through the proportional control valve to the second chamber.

16. The method of claim 15, wherein the pilot-operated valve is disposed downstream from the pressure control valve, and interposed between the pressure control valve and the first chamber of the cylinder actuator, wherein operating the control system in the first mode of operation includes:
actuating the pilot-operated valve via the pilot signal, thereby causing fluid discharged from the pressure control valve to flow through the pilot-operated valve to the first chamber.

17. The method of claim 15, wherein the pilot-operated valve is disposed upstream of the pressure control valve, and interposed between the source of fluid and the pressure control valve, wherein operating the control system in the first mode of operation includes:
actuating the pilot-operated valve via the pilot signal, thereby causing the pilot-operated valve to allow fluid flow from the source of fluid to the pressure control valve, which then provides fluid at a substantially constant pressure level to the first chamber.

18. The method of claim 15, wherein the control system further comprises a force sensor coupled to the piston and configured to provide force sensor information indicative of an actual force applied by the piston on the surface engaging implement.

19. The method of claim 18, further comprising:
receiving the force sensor information from the force sensor; and
based on the force sensor information, sending a valve command signal to the proportional control valve to vary pressure level of fluid provided to the second chamber, thereby changing fluid force applied to the piston when the control system is in the first mode of operation.

20. The method of claim 19, wherein operating the control system in the second mode of operation includes:
sending a valve command signal to the proportional control valve that renders the proportional control valve fully open; and
sending a signal to the source of fluid to vary pressure level provided by the source to the second chamber.

* * * * *